US009507182B2

(12) United States Patent
Williams

(10) Patent No.: US 9,507,182 B2
(45) Date of Patent: Nov. 29, 2016

(54) NANOCOMPOSITE ELECTRO-OPTIC MODULATOR

(71) Applicant: George Williams, Portland, OR (US)

(72) Inventor: George Williams, Portland, OR (US)

(73) Assignee: Vadient Optics. LLC., Beaverton, OR (US)

( * ) Notice: Subject to any disclaimer, the term of this patent is extended or adjusted under 35 U.S.C. 154(b) by 0 days.

(21) Appl. No.: 14/599,917

(22) Filed: Jan. 19, 2015

(65) Prior Publication Data

US 2015/0346521 A1 Dec. 3, 2015

Related U.S. Application Data

(63) Continuation-in-part of application No. 14/293,574, filed on Jun. 2, 2014.

(60) Provisional application No. 62/013,500, filed on Jun. 17, 2014.

(51) Int. Cl.
*G02F 1/035* (2006.01)
*G02F 1/065* (2006.01)

(52) U.S. Cl.
CPC ............... *G02F 1/035* (2013.01); *G02F 1/065* (2013.01)

(58) Field of Classification Search
CPC ................................. G02F 1/035; G02F 1/065
See application file for complete search history.

(56) References Cited

U.S. PATENT DOCUMENTS

| | | | |
|---|---|---|---|
| 5,498,444 A | 3/1996 | Hayes | |
| 5,692,075 A * | 11/1997 | Hwang et al. | 385/3 |
| 5,707,684 A | 1/1998 | Hayes et al. | |
| 5,751,867 A * | 5/1998 | Schaffner et al. | 385/3 |
| 5,800,000 A | 9/1998 | Shockley | |
| 5,807,906 A | 9/1998 | Bonvallot et al. | |
| 6,558,585 B1 * | 5/2003 | Zhang et al. | 264/1.27 |
| 6,593,415 B2 | 7/2003 | Koike et al. | |
| 6,656,990 B2 | 12/2003 | Shustack et al. | |
| 6,728,456 B1 * | 4/2004 | Aylward et al. | 385/124 |
| 6,805,902 B1 | 10/2004 | Hayes | |
| 6,836,371 B2 | 12/2004 | Lai et al. | |
| 6,934,088 B2 | 8/2005 | Lai et al. | |

(Continued)

FOREIGN PATENT DOCUMENTS

| | | |
|---|---|---|
| EP | 2412767 A1 | 2/2012 |
| EP | 2474404 A1 | 6/2012 |

(Continued)

OTHER PUBLICATIONS

Fuller, S B.; Wilhelm, Eric J.; Jacobson, Joseph M., "Ink-jet printed nanoparticle microelectromechanical systems," in Microelectromechanical Systems, Journal of, vol. 11, No. 1, pp. 54-60, Feb. 2002.*

(Continued)

*Primary Examiner* — Peter Radkowski

(57) ABSTRACT

A nanocomposite optical modulator device comprising an optically transparent electro-optic region. The electro-optic region exhibiting second-order optical nonlinearity properties. The nanocomposite optical modulator further comprises one or more dielectric layers, with at least one of the dielectric in contact with the electro-optic region, one or more electrodes in proximity to the electro-optic region. Wherein at least one of the aforementioned elements is nanocomposite material with nanoparticle loading from about 0.25% to about 70% volume.

25 Claims, 12 Drawing Sheets

(56) References Cited

U.S. PATENT DOCUMENTS

| | | | |
|---|---|---|---|
| 6,976,641 B2 | 12/2005 | Lai et al. | |
| 7,046,439 B2 | 5/2006 | Kaminsky et al. | |
| 7,172,811 B2* | 2/2007 | Denisyuk et al. | 428/402 |
| 7,226,966 B2* | 6/2007 | Kambe et al. | 524/432 |
| 7,420,743 B2 | 9/2008 | Lai et al. | |
| 7,473,721 B2 | 1/2009 | Harada et al. | |
| 7,816,439 B2* | 10/2010 | Kambe et al. | 524/432 |
| 8,358,880 B2* | 1/2013 | Liu et al. | 385/2 |
| 8,648,136 B2* | 2/2014 | Kambe et al. | 524/418 |
| 2003/0031438 A1* | 2/2003 | Kambe et al. | 385/122 |
| 2003/0081641 A1* | 5/2003 | Park | B82Y 20/00 372/43.01 |
| 2003/0175004 A1* | 9/2003 | Garito | G02B 6/122 385/143 |
| 2004/0071422 A1* | 4/2004 | Aylward et al. | 385/124 |
| 2005/0179986 A1* | 8/2005 | Gothoskar | G02F 1/025 359/321 |
| 2006/0217478 A1* | 9/2006 | Denisyuk et al. | 524/420 |
| 2007/0036510 A1* | 2/2007 | Ingman | B81B 7/0077 385/147 |
| 2007/0096087 A1* | 5/2007 | Catrysse | B82Y 20/00 257/40 |
| 2007/0208123 A1* | 9/2007 | Kambe et al. | 524/432 |
| 2009/0016666 A1* | 1/2009 | Kuo | B82Y 20/00 385/2 |
| 2010/0310205 A1* | 12/2010 | Liu et al. | 385/2 |
| 2011/0017952 A1* | 1/2011 | Kambe et al. | 252/301.36 |
| 2012/0148206 A1* | 6/2012 | Boivin | H01S 3/06716 385/123 |
| 2012/0319053 A1* | 12/2012 | Kambe | B82Y 20/00 252/500 |
| 2015/0021528 A1* | 1/2015 | Chartoff et al. | 252/582 |
| 2015/0023643 A1* | 1/2015 | Chartoff et al. | 385/124 |

FOREIGN PATENT DOCUMENTS

| | | |
|---|---|---|
| EP | 2469309 B1 | 8/2013 |
| EP | 2392473 B1 | 9/2013 |

OTHER PUBLICATIONS

Xiaohui Lin, Tao Ling, Harish Subbaraman, Xingyu Zhang, Kwangsub Byun, L. Jay Guo, and Ray T. Chen, "Ultraviolet imprinting and aligned ink-jet printing for multilayer patterning of electro-optic polymer modulators," Opt. Lett. 38, 1597-1599 (2013).*

DeRose et al., Pocket's coefficient enhancement of poled electro-optic polymers with a hybrid organic-inorganic sol-gel cladding layer, Applied Physics Letters, 89, 131102 (2006).*

Richard Chartoff, et al., Functionally Graded Polymer Matrix Nano-Composites by Solid Freeform Fabrciation: A Preliminary Report, Solid Freeform (SFF) symposium, [online], 2003, pp. 385-391, [retrieved on Apr. 23, 2015]. Retrieved from the Internet: <http://sffsymposium.engr.utexas.edu/Manuscripts/2003/2003-36-Chartoff.pdf>.

Richard Chartoff, et al., Polymer Matrix Nanocomposites by Inkjet Printing, Solid Freeform (SFF) symposium, [online], 2005, pp. 174-183, [retrieved on Apr. 23, 2015]. Retrieved from the Internet: <http://sffsymposium.engr.utexas.edu/Manuscripts/2005/2005-16-Chartoff.pdf>.

Gema De La Torre, et al., Role of Structural Factors in the Nonlinear Optical Properties of Phthalocyanines and Related Compounds, Chem. Rev. 2004, vol. 104, pp. 3723-3750, Published by American Chemical Society on the web Aug. 11, 2004, Retrieved from the internet: <http://pubs.acs.org/doi/abs/10.1021/cr030206t?journalCode=chreay>.

Henning Schroder, et al., Towards roll-to-roll manufacturing of polymer photonic devices, Proc. SPIE 8991, Optical Interconnects XIV, 899116, Mar. 8, 2014 [online], 7 pages, Retrieved from the Internet: <http://spie.org/Publications/Proceedings/Paper/10.1117/12.2044229>.

Y. Enami, et al, Hybrid electro-optic polymer and selectively buried sol-gel waveguides, Appl. Phys. Lett. 82, 490 [Online] (2003), Retrieved from the Internet: < http://dx.doi.org/10.1063/1.1539298>.

Christopher Derose, et al., High (delta) n strip-loaded electro-optic polymer waveguide modulator with low insertion loss, Optics Express 3316, Mar. 2, 2009 [Online], vol. 17, No. 5, Retrieved from the Internet: <http://www.opticsinfobase.org/oe/abstract.cfm?uri=oe-17-5-3316>.

Xiaohui Lin, et al. Towards High-Rate Fabrication of Photonic Devices Utilizing a Combination of Roll-To-Roll Compatible Imprint Lithography and Ink Jet Printing Methods, Proc. of SPIE vol. 8613, Mar. 5, 2013 [Online], Retrieved from the Internet: <http://proceedings.spiedigitallibrary.org/ on Mar. 5, 2013>.

Xiaohui Lin, et al, Ultraviolet imprinting and aligned ink-jet printing for multilayer patterning of electro-optic polymer modulators, Optics Letters, vol. 38, Issue 10, pp. 1597-1599, 2013, [Online], Retrieved from the Internet: <http://www.opticsinfobase.org/ol/abstract.cfm?uri=ol-38-10-1597>.

* cited by examiner

NANOCOMPOSITE ELECTRO-OPTIC MODULATOR

REFERENCE TO RELATED PATENTS

This application is a continuation-in-part of U.S. patent application Ser. No. 14/293,574 filed Jun. 2, 2014 and this application also claims the benefit of U.S. Provisional Patent Application No. 62/013,500 filed Aug. 8, 2014.

TECHNICAL FIELD OF THE DISCLOSURE

The present invention relates in general to electro-optic modulation devices. The invention relates in particular to electro-optic modulation devices made from nanocomposite material.

DISCUSSION OF BACKGROUND ART

Electric-optic modulators are devices that utilize the electro-optic effect. Materials that exhibit second-order electro-optic effect can be modulated with an electrical signal. Classic optical modulators have traditionally been made from single crystals with electrodes applying the electrical signal. This application relates to another approach.

SUMMARY OF THE DISCLOSURE

The present disclosure is directed to nanocomposite optical modulators. In one aspect, a device in accordance with the present disclosure comprises an optically transparent electro-optic region, exhibiting second-order optical nonlinear properties. One or more dielectric layers, with at least one of the layers in contact with the electro-optic region. One or more electrodes in proximity to the electro-optic region. Where at least one of the aforementioned elements is nanocomposite material with nanoparticle loading from about 0.25% to about 70% volume.

BRIEF DESCRIPTION OF THE DRAWINGS

The accompanying drawings, which are incorporated in and constitute a part of the specification, schematically illustrate preferred embodiments of the present disclosure, and together with the general description given above and the detailed description, of preferred methods and embodiment, given below, serve to explain principles of the present invention.

DETAILED DESCRIPTION

Figure 1A:
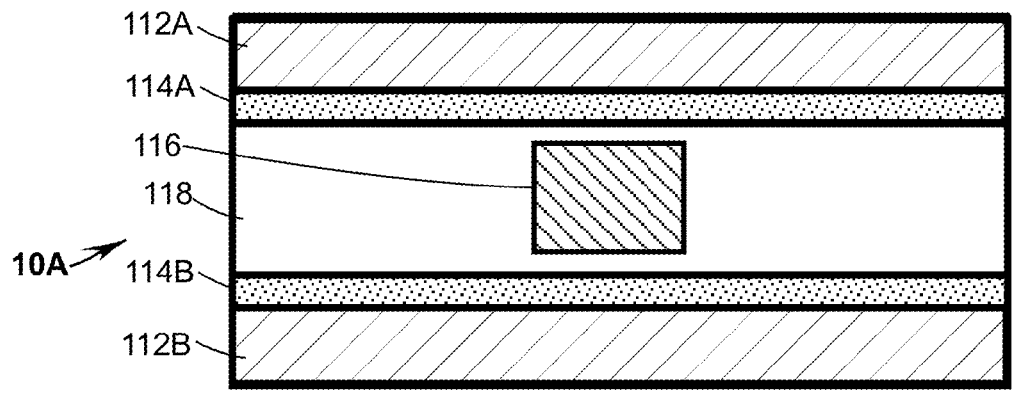
FIG. 1A is a cross-section view, schematically illustrating a nanocomposite electro-optical modulator (EO-modulator) in accordance with the present disclosure, the EO-modulator comprising a optically transparent electro-optic region exhibiting second-order optical nonlinearity properties, one or more dielectric layers, with at least one of the layers in contact with the electro-optic region, one or more electrodes in proximity to the electro-optic region, wherein at least one of the aforementioned elements is nanocomposite material with nanoparticle loading from about 0.25% to about 70% volume.

Referring now to the drawings, wherein like components are designated by like reference numerals. Methods of manufacture and preferred embodiments of the present disclosure are described further herein below.

FIG. 1A schematically illustrates an optically transparent channel 10A. Optically transparent A has an electro-optic region 116. Electro-optic region 116 is in contact with, and encompassed by, a dielectric layer 118. Dielectric layer 118 is in contact, above, with a dielectric-layer 114A, followed by an electrode 112A. Dielectric-layer 118 is in contact, below, with a buffer layer 114B followed by an electrode 112B.

The electro-optic region is optically transparent, made from amorphous $7c$-functional material, exhibiting second-order optical nonlinearity properties, with resistivity $10^{-9}$ Ohms ($\Omega$) or less, such as electro-optic polymers (EO-polymers). Chromophore dipole moment-molecular hyperpolarizability product (mb) values greater than $10^{-44}$ electrostatic units (esu) are now routinely achieved. This improvement has been achieved without sacrifice of thermal or chemical stability. For example the decomposition temperature of phenyl vinylene thiphene vinylene (FTC) chromophores is about 325° C. Intermolecular electrostatic interactions result in a maximum in the plot of EO activity reverse chromophores loading in a host polymer matrix. The position of this maximum shifts to lower loading with increased chromophores dipole moment and hence dipole moment-hyperpolarizability product. Attenuation of electro-optic activity is most severe for prolate ellipsoidal chromophores and less sever for spherical chromophores. Chromophores shape and structure can be used to optimize electro-optic activity. An electro-optic coefficient (r33) defines the strength of the materials electro-optic effect. An electro-optic coefficient value of 80 pm/V or above is desirable.

Some nonlimiting examples of EO-polymers and materials that can be used for the electro-optic region include AJ307, AJ309, AJ404, AJLZ53, AJ-CKL1, AJCKL1, AJLS102, AJPL172 in bisphenol A polycarbonate (BPAPC), AJLZ53 in amorphous polycarbonate (APC), and SEO 100 (in various percent volume). Aforementioned EO-polymers are commercially available from Soluxra, LLC located in Seattle, Wash. The nanoparticles can be mixed with the EO-polymers, discussed further hereinbelow, creating a hybrid EO-polymer nanocomposite.

Organic EO-polymers have chromophores with a permanent dipole moment that are randomly distributed. In order for the EO-polymer to exhibit second-order nonlinearity, required for operation of the optical-modulator, the chromophores must be poled (aligned). Poling is a process that aligns the chromophores. General poling techniques include contact poling and corona poling. Contact poling requires heating the EO-polymer close to the EO-polymers' glass transition, applying an electric field across the electrodes that contact the EO-polymer, causing the dipoles to align, then cooling the EO-polymer. The electric field is created by applying a poling voltage from about 100 Volts (V) to about 1,000 V. Corona poling is similar to contact-poling, but the electric field is built up by charge accumulation on the surface of the EO-polymer by corona discharge of a conductor at high voltage. Those skilled in the art will generally recognize poling techniques described, see Se Huang et al, "Advanced processing method to introduce and preserve dipole orientation in organic electro-optic materials for next generation photonic devices". The EO-polymers refractive index can be tuned with introduction of nanoparticles. Nanoparticles can be bonded to the organic matrix of the EO-polymer by ionic bonds or covalent bonds. Alternatively, nanoparticles can be added without bonding to the organic matrix. Nanoparticles without bonds will result in faster diffusion and mixing between adjacent layers.

Dielectric layer 118 is preferably nanocomposite with material properties tunable by different concentration of nanoparticles in a host-matrix. Properties that are tunable include optical, thermal, electrical, and mechanical. For example, dielectric layer 118 can act as a cladding-layer to the electro-optics region by having the nanocomposite-ink's refractive-index tuned lower than the electro-optic region's refractive-index, creating a step-index waveguide, confining light-radiation within the electro-optic region, the electro-optic region acting as a core, of the waveguide. Similarly, dielectric layer 118 can be composed of multiple layers or otherwise have nonuniform and continuously changing nanoparticle concentration such that the dielectric properties, including refractive-gradient, are lower than that of the electro-optic region. For example, by radially varying the refractive index of the dielectric surrounding the electro-optic region a gradient-index waveguide can be created. One method of creating a multiple layers or a continuous refractive gradient is by utilizing ink-jet printing technology, described further herein below. The nanoparticles and the organic-host of dielectric layer 18 can be chosen to modify the resulting nanocomposite's dielectric strength, thermal conductivity, mechanical stability, ferroelectric properties, magnetic properties, electrical conductivity and coefficient of thermal expansion.

Dielectric-layer 114A and 114B are also preferably nanocomposite with tunable material properties. Dielectric layer 114A and 114B preferably act as a dielectric buffer-layer, protecting the electro-optic region from charge injection and to reduce leakage current during poling. The dielectric buffer-layer's organic-host and the nanoparticles are preferably chosen such that the material has high dielectric strength. Suitable organic-host material, discussed further herein below, generally exhibit high dielectric strength. Addition of nanoparticles with high dielectric strength increase the dielectric strength of the resulting nanocomposite. Some of the nanoparticles that exhibit high dielectric strength include zirconium dioxide ($ZrO_2$) alumina, and titanium oxide. The polymers can include cyanoethyl pullulan (CYELP), polyacrylate, hexanediol diacrylate (HDODA), polymethyl methacrylate (PMMA), and SU-8. The dielectric constant of the nanocomposites can be tuned by varying the concentration of the nanoparticles in the nanocomposite dielectric layers. Alternatively, the nanoparticles and the organic-host can be chosen to modify dielectric layer's 18 dielectric strength, thermal conductivity, electrical conductivity, coefficient of thermal expansion, and mechanical stability.

When an alternating current flows through a circuit, the relation between current and voltage across a circuit element is characterized not only by the ratio of their magnitudes, but also the difference in their phases. Reference to electrical conductivity in dielectrics or the electro-optic region, for purposes of this application, means the imaginary component of the complex valued permittivity, wherein a perfect conductor has an infinite conductivity and a perfect dielectric has a real-valued permittivity, with zero imaginary component. In a lossy medium, the size of the displacement current is dependent on the frequency of the applied field; there is no displacement current in a constant field. At low frequencies, the contributions to the energy dissipation and energy storage from the resistive and reactive elements are decoupled. In contrast, at high frequencies, the stored electromagnetic energy contributes partially to the resistance, and the power dissipation contributes partially to the reactance. For improved electric poling, thus achieving a higher r33, reduced resistance in the high dielectric strength cladding layers may be desirable to reduce the half wave voltage required to polarize the chromophores in the electro-optic material of the optical channel. Nanofillers can be added to the dielectric cladding layer between the electrode and the EO region of the optical channel, which can reduce the resistance of the dielectric cladding material and improve the poling efficiency of layered structure for the EO-modulators.

The electrodes are preferably an ink-jet printable conductive-ink. Two types of suitable conductive-inks are metalorganic decomposition ink (MOD-ink) and more generally, conductive nanocomposite-ink. MOD-ink are solvent based inks with metallic salts such as silver salt. However, aqueous based nanocomposite inks endows a variety of advantages over conventional MOD-ink based on organic solvents in printing narrow conductive patterns without irregular morphologies and without residual contaminants. The conductive nanocomposite-ink are suspensions of metal nanoparticles such as silver and copper. The conductive nanocomposite-inks are commercially available at a variety of manufacturers, for example, silver based nanocomposite-inks are available at Novacentrix in Austin, Tex. in The United States, Cabot Corporation in Boston, Mass. in The United States, and Samsung ElectroMechanics in Suwon, Gyeongg-do in South Korea.

The conductive-ink requires a sintering process in order to create continuous connectivity of the conductive nanoparticles. The sintering process can include implementation of a furnace to increase the temperature of the conductive-ink. Temperatures of the EO-modulator must be kept below the glass transition of the polymers. Preferably the temperature of the EO-modulator is kept below 100° Celsius (C). A number of techniques can be implemented to avoid high temperatures while allowing continuous connectivity of the conductive nanoparticles. Hydrochlorides solutions can be used to dissolve chemical coating on the nanoparticles. Direct localized heating of the conductive-inks can be achieved through direct resistive heating. Pulsed light can sinter the material via pulsed ultraviolet xenon arc lamps, near infrared, or other radiation sources.

Figure 1B:
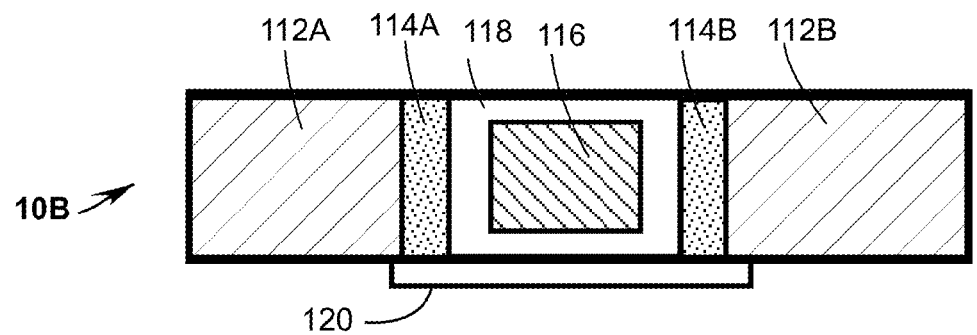
FIG. 1B is a cross-section view, schematically illustrating an optically transparent channel including the EO-modulator of that shown in FIG. 1A, where the EO-modulator elements are horizontal.

FIG. 1B schematically illustrates an optically transparent channel 10B. Optically transparent channel 10B is similar to the optical channel shown in FIG. 1A having the same elements, except the elements comprising the optically transparent channel are situated horizontally. In addition to those elements, a heating-element 120, is located in connection with cladding layer 118 in close proximity to electro-optic region 116. Heating-element 120 can be utilized during poling of EO-polymer in the electro-optic region. Heating-element 120 can also be utilized during the sintering process of the conductive-inks. Additionally, heating-element 120 can be utilized to alter optical properties of the optical-modulator via the thermo-optic effect. For instance, the refractive index can be offset with increased temperature, or alternatively modulation of the heating element can modulate the refractive index, thereby modulating the phase of light, as is well known in the art. Heating-element 120 is preferably highly resistive in the region near the electro-optic region and converts electrical current into heat through joule heating in that region. Joule-heating heating is well known in materials such as NiChrome, Nichrome is a non-magnetic alloy of nickel, chromium, and often iron, used as a resistance wire. The resistance wire can be deposited using photolithographic patterning, or preferably ink-jet printing, using nanocomposite-ink.

FIB. 1C schematically illustrates an optically transparent channel 10C. Optically transparent channel 10C is similar to optically transparent channel 10A, except that the electro-optic region in optically transparent channel 10C is horizontally continuous. Electro-optic region 116 is in contact, above, with dielectric cladding-layer 118A followed by dielectric buffer-layer 114A and then electrode 112A. Electro-optic region 116 is in contact, below, with dielectric cladding-layer 118B, followed by dielectric buffer-layer 114B, then electrode 112B.

A variety of techniques can be utilized for deposition of the aforementioned elements. Ink-jet printing can be utilized to deposit and form the conductive-ink, the dielectric layers, and the electro-optic polymers. Alternatively, spin-on techniques, and UV imprinting can be utilized.

Figure 2A:
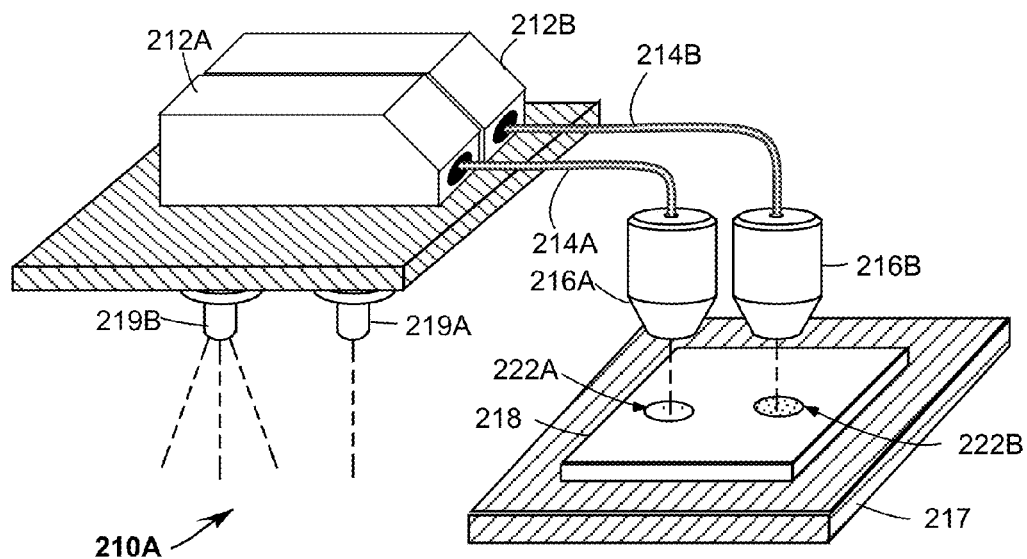
FIG. 2A is a perspective view, schematically illustrating an inkjet printer for printing nanocomposite-ink.

FIG. 2A shows ink-jet printing apparatus 210A for deposition of nanocomposite-ink in accordance with the present disclosure. Printing apparatus 210 is simplified for explanatory purposes. Those skilled in the art will generally recognize the ink-jet printing approach, see Richard Chartoff et al., "Functionally Graded Polymer Matrix Nano-Composites by Solid Freeform Fabrication (SFF)," presented at the 2003 Solid Freeform (SFF) symposium and Richard Chartoff et al., "Polymer Matrix Nanocomposites by Ink-jet Printing" presented at the SFF symposium in 2005.

A printing apparatus 210A has a reservoir 212A and 212B that hold a nanocomposite-ink 222A and 222B, respectively. Reservoirs 222A and 222B provide a printing-head 216A and 216B with nanocomposite-ink 222A and 222B via a feed-line 214A and 214B, respectively. Printing-heads 216A and 216B deposit nanocomposite-ink 222A and 222B, on a substrate 218 at particular voxels, thereby forming a nanocomposite structure, such as the EO-modulator of the present disclosure. Voxels refer to positions in three-dimensional space. A stage 217 positions substrate 218, with respect to the printing-heads, for deposition of the nanocomposite-inks at particular voxels.

Substrate 218 can be made from a variety of materials which include plastics, glasses, metals, ceramics, organic resins, electronic circuits, and wafers contacting electronic or electro-optic components. Substrate 218 can become part of the nanocomposite structure or alternatively the nanocomposite structure may be removed from the substrate. For applications in which the substrate becomes part of the optical-element, the substrate may be chosen for specific properties. For example, in applications where the EO-modulator is being formed, the substrate material may be conductive metal acting as a ground plane. The substrate may be a silicon wafer with microelectronics, where the electrodes are in contact with the electronics. Additionally, silicon oxide layers on the silicon wafer can be utilized as the dielectric layers for at least one side of the EO-modulator. Alternatively, the substrate may be a mold material with anti-sticking properties, allowing removal of the nanocomposite structure from the mold.

After deposition of nanocomposite-ink from one of the printing-heads, substrate 218 can be positioned with respect to a radiation source 219A for selective-curing of the nanocomposite-ink, at voxels. Selective-curing refers to localized radiation about voxels, activating the organic-host matrix. Activation of the organic-host matrix solidifies the nanocomposite-ink. Selective-curing means zero-curing, partial-curing, or fully-curing, which respectively means not solidifying, partially solidifying, or fully solidifying the nanocomposite-ink. Another radiation source 219B flood cures the substrate the nanocomposite-ink on the substrate. Flood curing is desirable when the all the nanocomposite-ink needs to be partially or fully cured.

Figure 2B:
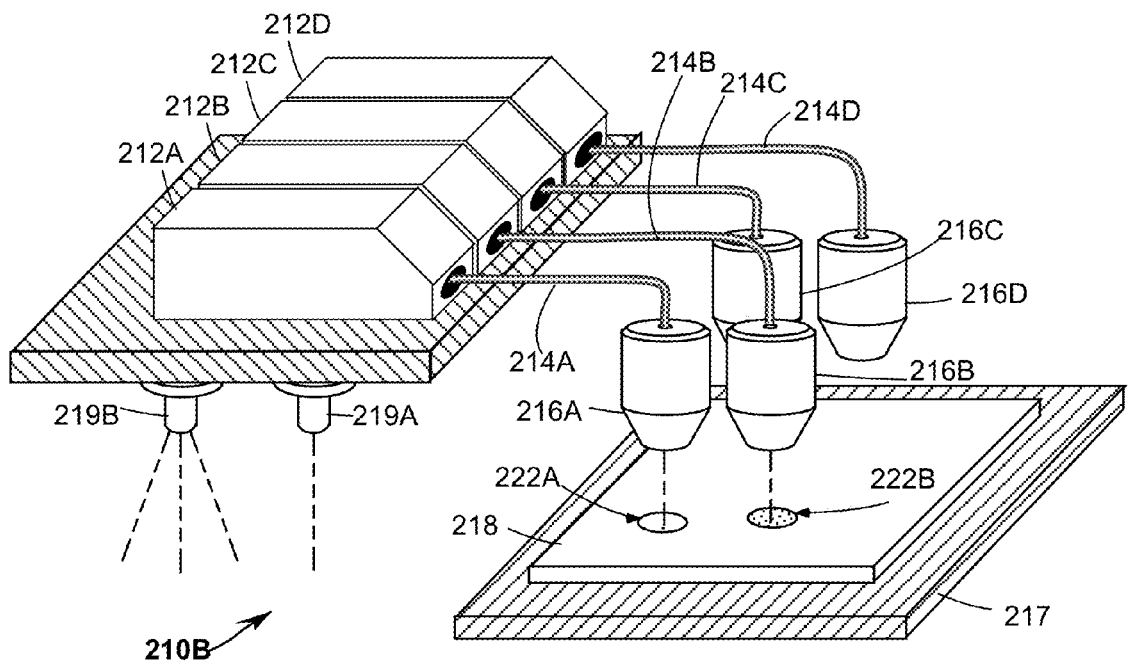
FIG. 2B is a perspective view of that shown in FIG. 2A with two additional printheads.

FIG. 2B illustrate a printing apparatus 210B similar to the printing apparatus shown in FIG. 2A with additional reservoirs 212C and 212D, holding a nanocomposite-ink 222C and 222D a feed-line 214C and 214D, and a printing head 216C and 216D, respectively. The additional printing heads provide additional nanocomposite-ink different from the nanocomposite-ink in other printing heads. Different nanocomposite-ink can be the nanocomposite-ink utilized to form the EO-modulator. For instance, one of the reservoirs can hold the nanoparticle conductive-ink, another can hold the nanocomposite-ink for the dielectric cladding-layer, and yet another can hold the nanocomposite-ink for the dielectric buffer-layer. The printing-heads can hold different nanocomposite-inks, for the dielectric buffer-layers, and deposited in techniques mentioned herein below allowing complicated refractive-gradients to be formed. Further, reservoirs can isolate the nanoparticles and the organic-host and mix on demand for various nanoparticle concentration from any one of the printing heads.

Figure 1C:
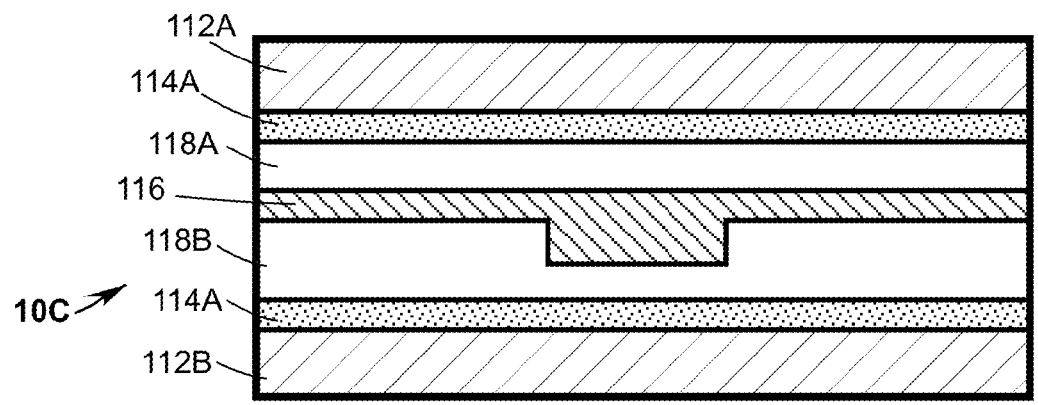
FIG. 1C is a cross-section view, schematically illustrating of an optically transparent channel similar to that shown in FIG. 1A, except here, the electro-optic region is continuous.

For those EO-polymers that are appropriate for ink-jet printing, they may be held in one of the reservoirs. Alternatively, EO-polymer may be applied using ultra-violet nanoimprinting or nanostamping technology, which allows features on the nanometer scale. For features that are sufficiently small, nanoimprinting technology is a preferred method. In nanoimprinting an original silicon mold with appropriate sized features is created using lithography techniques well known in the art. A flexible mold material is then created from the original silicon mold. The flexible mold has the desired patterns to imprint via stamping. For example, a single-mode waveguide can be imprinted into the dielectric cladding layer, then filled with EO-polymer, to create EO-modulator in accordance with the present disclosure. First, the layers up to the EO-polymer are deposited via ink-jet printing, spin-on techniques, or other well-known processes. The dielectric cladding layer is partially gelled by exposure to ultraviolet light. The flexible mold is then pressed into the gelled dielectric cladding-layer. The gelled cladding layer is sufficiently cured such that it takes the shape of the mold. The mold is then released, leaving an imprint in the cladding-layer, which is then cured holding the mold's feature shape. The EO-polymer can then be deposited filling the imprinted features. Such techniques allows waveguide channels, such as those shown in FIG. 1A, FIG. 1B, and FIG. 1C, to be sufficiently small to act as single-mode waveguides. Alternatively, a nanostamp can be used to pattern features in either a positive or negative pattern in photoresist or metal that can be optically cured. Then wet chemical processing or inductively coupled plasma etching, can be used to define the features.

Figure 2C:
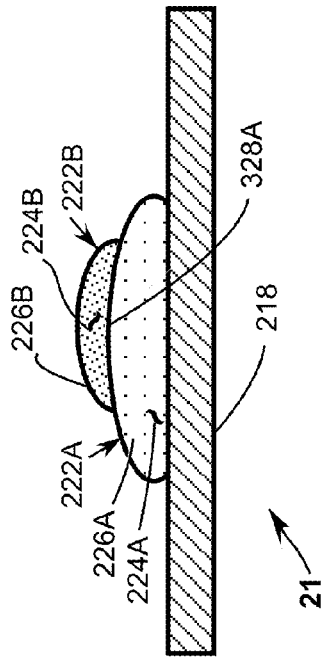
FIG. 2C is a cross-section view, schematically illustrating nanocomposite-ink deposited on a substrate.

FIG. 2C schematically illustrates further detail of the deposition of the nanocomposite-ink shown in FIGS. 2A and 2B. Nanocomposite-ink 222A, deposited on substrate 218 is bounded by a nanocomposite-air interface 226A. The nanocomposite-ink consists of the organic-matrix with a dispersed nanofillers 224A throughout the organic-matrix. The organic matrix is ink-jet printable, optically clear, photo-curable resin. Depending on the element of the EO-modulator different nanocomposite-inks will be used. As aforementioned, conductive nanocomposite-ink is primarily silver based. Four non-limiting examples of printable organic-matrix material for the dielectric layers are polyacrylate, hexanediol diacrylate (HDODA), polymethyl methacrylate (PMMA), diethylene glycol diacrylate (DEGDA) and SU-8. The nanofillers are ceramic nanoparticles sufficiently small with respect to light wavelengths, for those wavelengths intended for use, not to scatter the light. The nanocomposite-ink can be different by the nanofiller type, the organic-host matrix type, or concentration of nanofillers and combinations thereof. Non-limiting examples of nanofillers include beryllium oxide (BeO), aluminum nitride (AlO), silicon carbide (SiC), zinc oxide (ZnO), zinc sulfide (ZnS), zirconium oxide (ZrO), yttrium orthovanadate ($YVO_4$), titanium oxide ($TiO_2$), copper sulfide ($CuS_2$), cadmium selenide (CdSe), lead sulfide (PbS), molybdenum disulfide ($MoS_2$) and silicon dioxide ($SiO_2$), including those with core, core-shell, and core-shell-ligand architectures. The refractive-index of the dielectric cladding-layer can be modified by the nanocomposite-ink used. The nanocomposite-ink can be tuned by the organic-host type, nanofiller type, and the concentration of the nanofillers in the organic-matrix. The refractive-index of a nanocomposite-ink will be the summation by percent volume of the optical properties of the organic-host and the nanofillers. Concentration by volume of the nanoparticles to the organic-host about 0.25% to about 70% volume, depending on the desired change in properties. Various examples of nanoparticle and organic-host combinations and chemistries is described in U.S. patent application Ser. No. 14/036,660, commonly owned and assigned to the assignee of the present invention, the complete disclosure of which is hereby incorporated by reference.

Figure 2D:
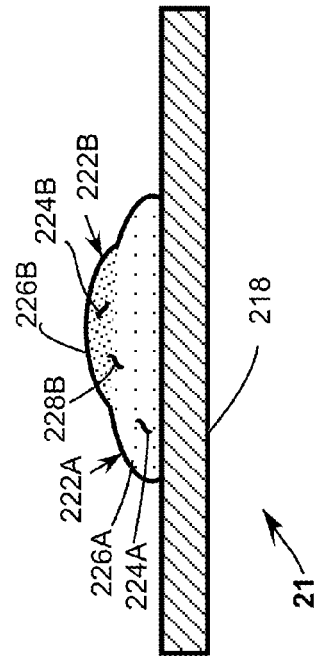
FIG. 2D is a cross-section view, schematically illustrating an additional deposit of nanocomposite-ink.

FIG. 2D schematically illustrates the nanocomposite structure 21 shown in FIG., 2C with an additional deposit of a nanocomposite-ink 222B at a voxel above the voxel of nanocomposite-ink 222A. Here, nanocomposite-ink 222B is shown after deposition, characterized by a dispersed nanofillers 226B, an ink-ink interface 228A (where mixing between nanoparticle-inks has not yet occurred), and an air-ink interface 226B.

Figure 2E:
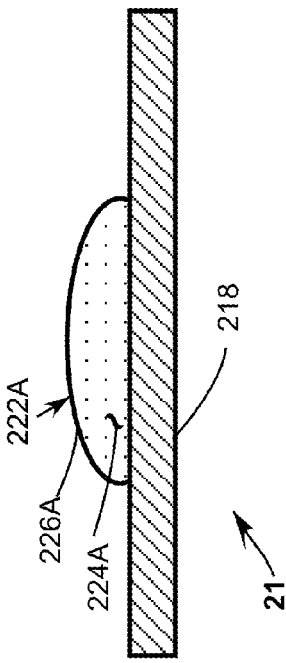
FIG. 2E is a cross-section view, schematically illustrating the resultant nanocomposite from the diffusion or convective mixing of nanofillers from the first and the second nanocomposite-ink as shown in FIG. 2D.

FIG. 2E schematically illustrates the nanocomposite structure 21 as that shown in FIG. 2D, wherein the selective-curing of nanocomposite-ink 222A before deposition of nanocomposite-ink 222B was zero-curing. A nanocomposite-ink 230 is the resultant mixture of uncured nanocomposite 222A and 222B. Nanocomposite-ink 230 is characterized by an air-ink interface 232 and nanofillers 224A and 224B dispersed within. A refractive-gradient between the top and bottom of nanocomposite-ink 230 depends on convective mixing resulting from relative size, velocities, and nanofiller concentrations between the nanocomposite-inks, any partial-curing of nanocomposite-ink 222A drop before deposition of nanocomposite-ink 222B, the temperature of the substrate, and time allowed for diffusion of nanofillers from nanocomposite-inks 222A and 222B, before additional partial-curing of the nanocomposite-inks.

Figure 2F:
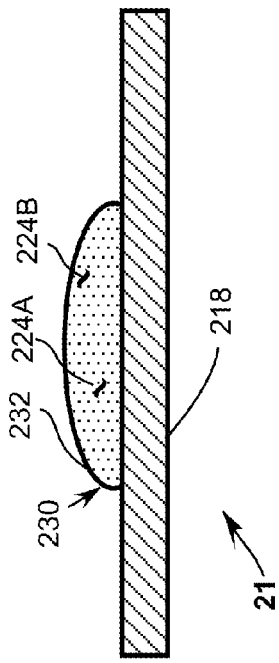
FIG. 2F is a cross-section view, schematically illustrating a resultant refractive-gradient between the first nanocomposite-ink and second nanocomposite-ink from diffusion of nanofillers of the first and second nanocomposite-inks, where the first nanocomposite was partially cured before deposition of the second nanocomposite-ink.

FIG. 2F schematically illustrates the nanocomposite structure of that shown in FIG. 2D wherein nanocomposite 222A was partially cured. Here, partial-cure of nanocomposite 222A results in a gradient-area 222B between nanocomposite 222A and 222B. The extent of gradient-area 222B depends on the selective-cure of nanocomposite-ink 222A. Zero-curing allows mixture of the nanocomposite-inks as exemplified in FIG. 2E. Partial-curing allows diffusion in a limited gradient area 228A as exemplified in FIG. 2F. Fully-curing allows little diffusion and results in a substantially ink-ink interface 228A as exemplified in FIG. 2D. In addition to controlling gradient-areas, partial-curing before subsequent deposition reduces stress and strain in the resultant optical-element.

Figure 2G:
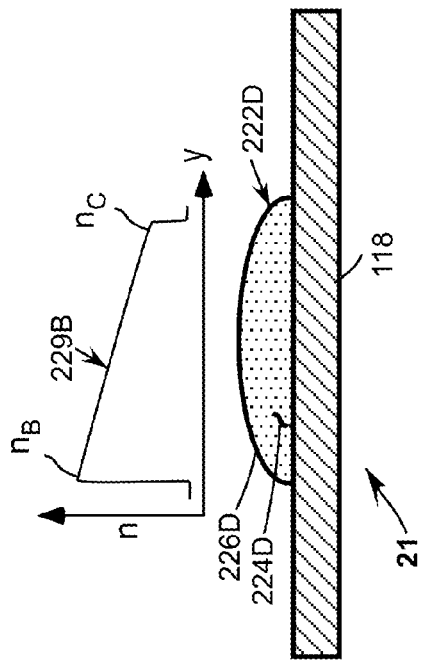
FIG. 2G is a cross-section view, schematically illustrating deposition of the nanocomposite-ink side-by-side.

FIG. 2G schematically illustrates the nanocomposite structure 21 shown in FIG. 2A and FIG. 2B where the nanocomposite-ink is deposited side-by-side. Here, nanocomposite-ink 222B with nanofillers 224B and ink-air interface 226B is deposited along the side of a nanocomposite-ink 222C. Nanocomposite-ink 222C has no nanofillers bound by an air-interface 226C.

Figure 2H:
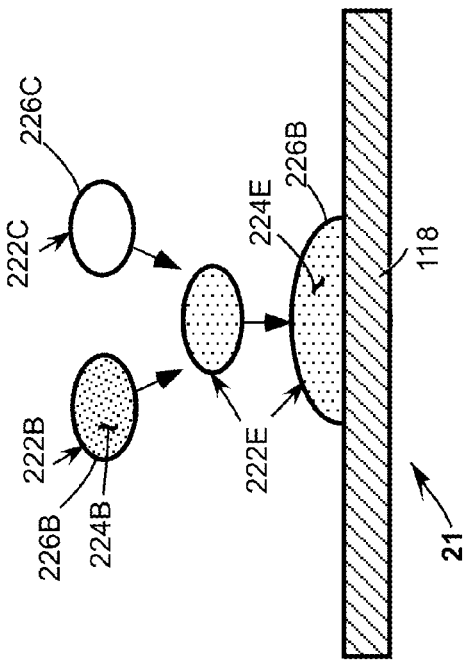
FIG. 2H is a cross-section view, schematically illustrating that shown in FIG. 2G, where nanocomposite-ink mixing resulted in a slow transition in the refractive-gradient profile.

FIG. 2H schematically illustrates the nanocomposite structure 21 as shown in FIG. 2G, where nanocomposite-ink 222B has mixed with nanocomposite 222C resulting in a gradient nanocomposite 222D. Here nanocomposite 222D is bounded by an ink-air interface 226D, has nanofillers 224D, the same nanofillers as nanocomposite-ink 222B, distributed according to a refractive-gradient profile 229B. The gradient is a result of mixture of the nanocomposites where the partial-curing of nanocomposite 222B was minimal and aforementioned convective mixing and time was allowed before further partial-curing. Refractive-gradient profile 229B is characterized by a high refractive-index $n_B$, the high refractive-index due to higher concentration of nanoparticles 224D, the refractive-gradient's refractive-index slowly and smoothly transitioning in the y-direction to a low refractive-index $n_C$, the low refractive-index due to the low concentration of nanoparticles 224D.

Figure 2I:
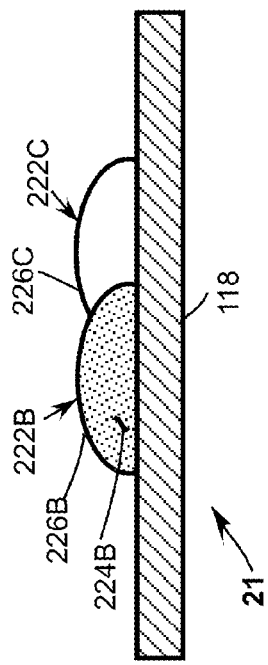
FIG. 2I is a cross-section view, schematically illustrating that shown in FIG. 2G, where nanocomposite-ink mixing resulted in a fast transition in the refractive-gradient profile.

FIG. 2I schematically illustrates the nanocomposite structure 21 as shown in FIG. 2G, where nanocomposite-ink 222B has been partially-cured before deposition of nanocomposite-ink 222C. Here partial-cure of nanocomposite-ink 222B, results in limited mixing of nanocomposite-ink 222C at an interface 224AB, resulting in a refractive-gradient 229C. Refractive-gradient profile 229C is characterized by high refractive-index $n_B$, the high refractive-index due to higher concentration of nanoparticles 224D, the refractive-gradient's refractive-index unchanging in the y-direction until quickly transitioning to low refractive index $n_B$ at former interface 224AB. Alternatively, refractive-gradient profile 229C could be produced without partial-curing of nanocomposite-ink 222B, before deposition of nanocomposite 222C, by limiting the aforementioned mixing factors, such as controlling nanocomposite-ink deposition velocities, and limiting diffusion temperature control of the substrate, and curing the deposited nanocomposite-inks within a controlled time.

Figure 2J:
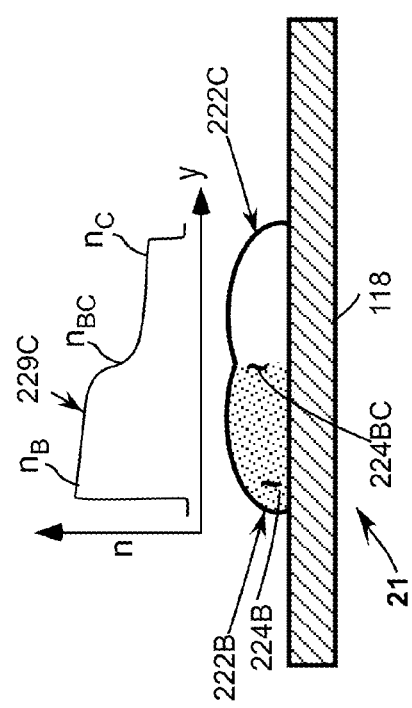
FIG. 2J is a cross-section view, schematically illustrating mixing of nanocomposite-inks in air.

FIG. 2J schematically illustrates another nanocomposite-ink mixing method. Nanocomposite-ink 226B and nanocomposite-ink 226C are deposited such that the respective printing heads are aligned to cause the nanocomposite-ink to mix in air creating a nanocomposite-ink 222E. Nanocomposite-ink 222E, then deposits, mixed, onto substrate 118 with a nanofillers 224E bounded by ink-air interface 226B.

Figure 3A:
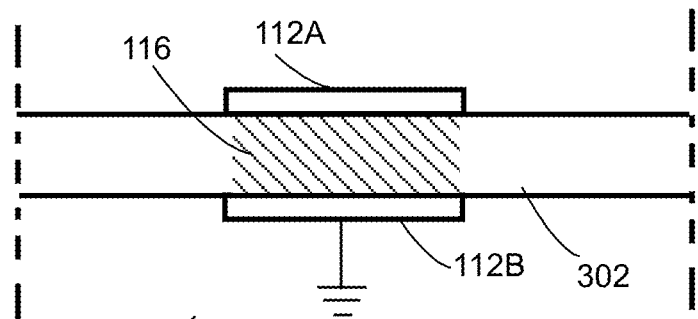
FIG. 3A is a cross-section view, schematically illustrating an optically transparent optical channel including a phase EO-modulator.

FIG. 3A schematically illustrates a phase EO-modulator 30 in accordance with the present disclosure. EO modulator 30 is drawn in without detail of the dielectric-layers. The EO-modulator structure as described in FIGS. 1A, 1B, and 1C and method of manufacture aforementioned can be utilized and is applicable for the present implementation of the E-O modulator and others described herein below. EO-modulator 30 is shown as a simple waveguide with electro-optic region 116. The waveguide geometry will depend on the refractive index of material used and the wavelength of light, as is well known in the art. Light passes through a waveguide 302 connected to the electro optic region is phase modulated with electrical modulation across electrode 112A, connected to a single generator and electrode 112B, connected to electrical ground. Modulation of the electro-topic region modulates the electro-optic region refractive index via second-order nonlinearity effects. The electro-optic region refractive index change causes a change in the optical path length along the electro-optic region, thereby inducing a phase change of light passing through. A potential on the order of a few volts is typically needed for phase modulation.

Figure 3B:
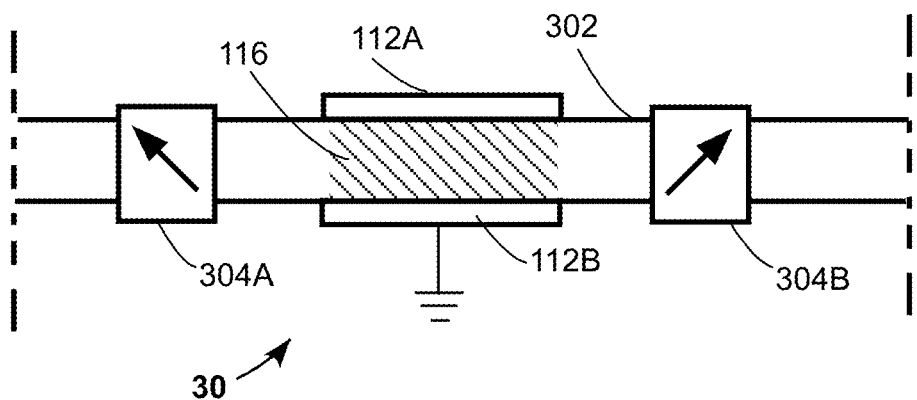
FIG. 3B is a cross-section view, schematically illustrating that shown in FIG. 3A with the addition of two polarizers.

FIG. 3B schematically illustrates an amplitude EO-modulator 31. EO-modulator 31 is the same as that EO-modulator shown in FIG. 3A with the addition of two crossed linear polarizers. A polarizer 304A is positioned on waveguide 302 such that light passes through the polarizer before entering the electro-optic region. A polarizer 304B is positioned after the electro-optic region and orientated 90 degrees with respect to Polarizer 304A, the polarizers blocking light whose phase is otherwise unchanged, allowing no light to pass through the amplitude EO-modulator. Phase modulation of the light passing through the electro-optic region changes the phase of the light such that it is not completely blocked by polarizer 304B. Those skilled in the art will generally recognize the design.

Figure 3C:
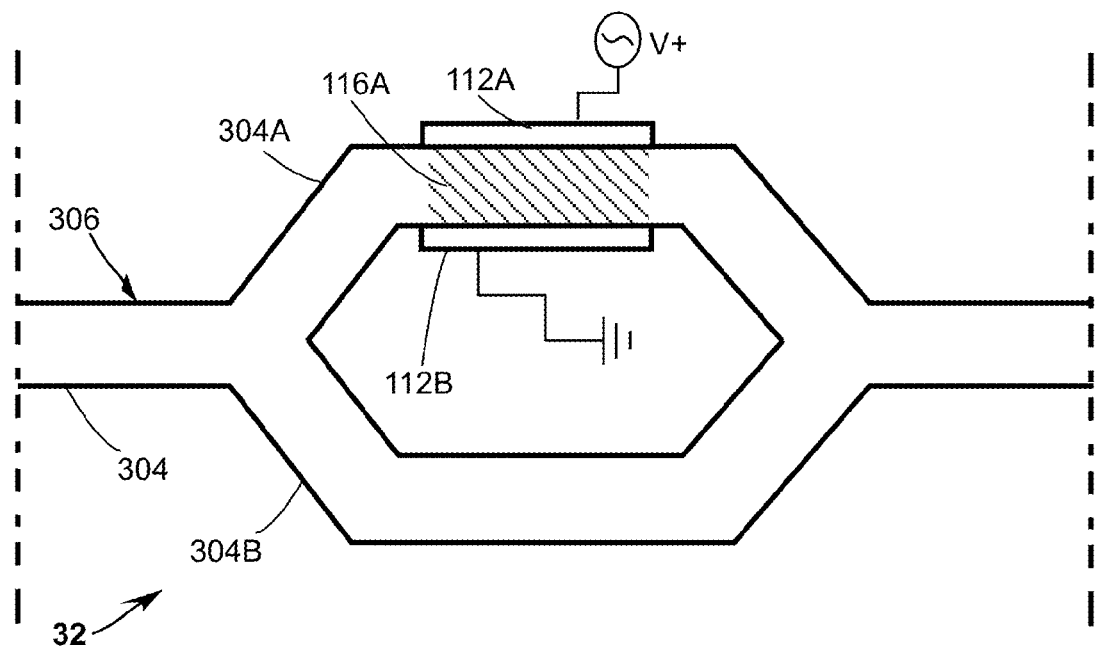
FIG. 3C is a cross-section view, schematically illustrating a Mach-Zender (MZ) type optical-modulator.

FIG. 3C schematically illustrates another EO-modulator 32. EO-modulator 32 has a waveguide 306 which comprises a single waveguide 304 which splits into a first arm 304A and a second arm 304B, recombining into single waveguide 304. First arm 304 has electro-optic region 116A, accompanying dielectric layers (not shown), and electrodes 112A and 112B. Second arm 304B has no electro-optic region. Phase modulation in the first arm causes phase shift between light recombining from the first arm and the second arm resulting in constructive or destructive interference, thereby modulating output from waveguide 304. Those skilled in the art will generally recognize the design as a Mach-Zender (MZ) type EO-modulator.

Figure 3D:
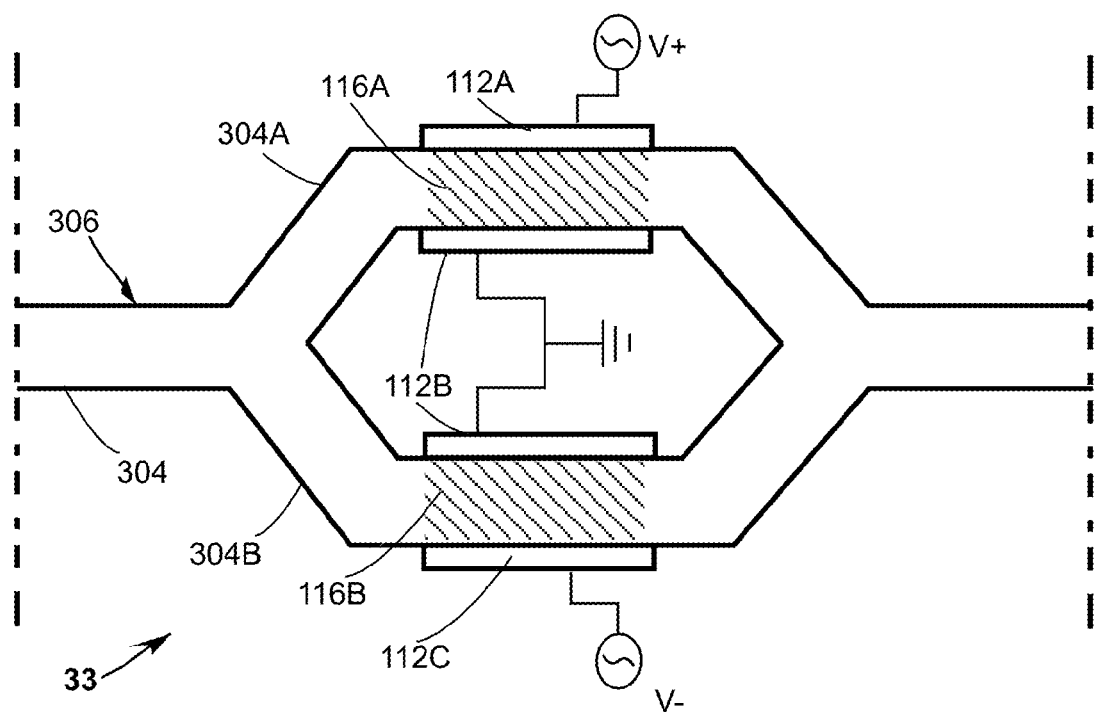
FIG. 3D is a cross-section view, schematically illustrating that shown in FIG. 3C with the addition of another of the optical-modulators, exemplifying the push-pull type MZ optical.

FIG. 3D schematically illustrates a push-pull EO-modulator 33. Push pull modulator 32 is similar to the modulator shown in FIG. 3C with the addition of an EO-modulator in second arm 304B. Second arm 304B has electro-optic region 116B and electrodes 112C and commonly shared ground electrode 112B. Electric signal applied to electrode 112C is inverted as compared to electrode 112A resulting in push-pull type modulation.

Figure 3E:
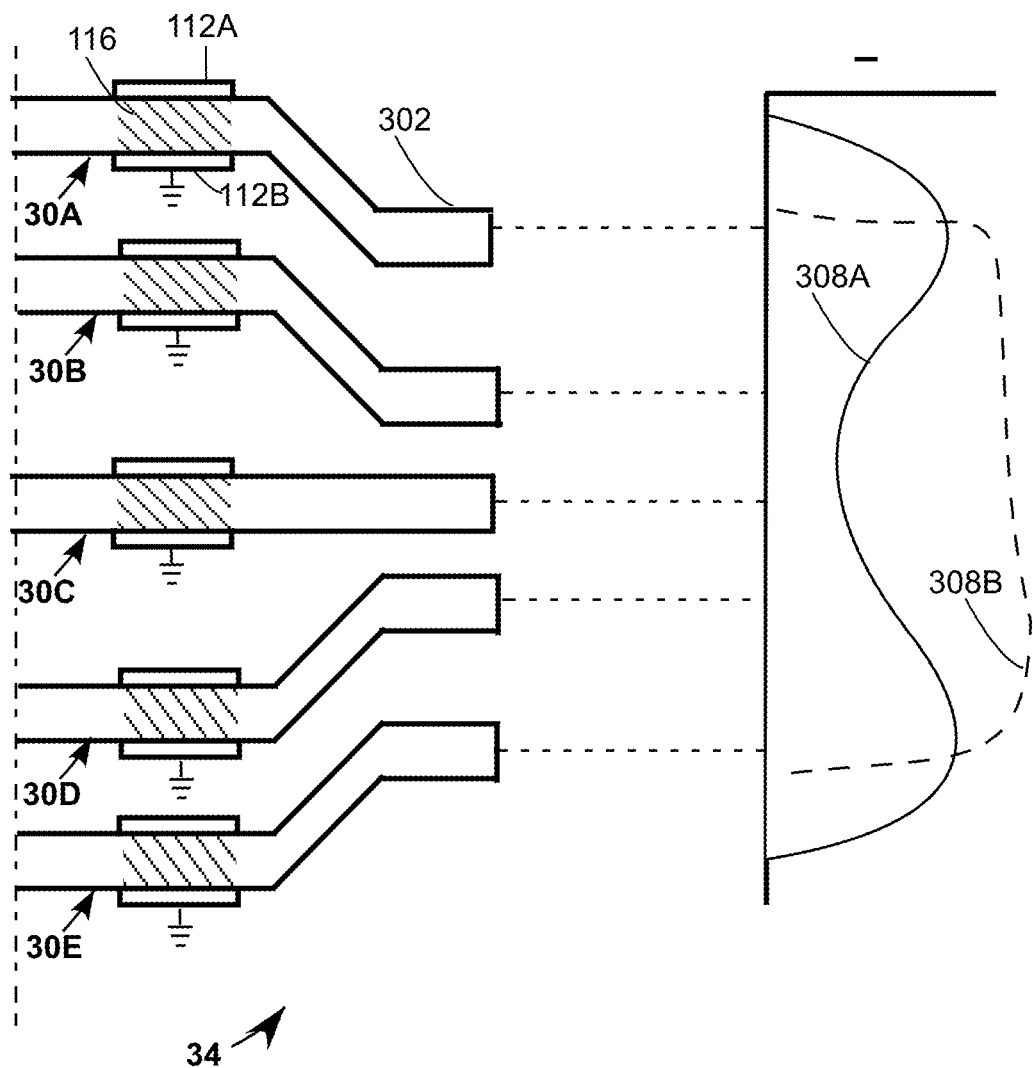
FIG. 3E is a cross-section view, schematically illustrating a plurality of the optically transparent channels including a respective EO-modulator, in a two-dimensional linear array.

FIG. 3E schematically illustrates a linear array of EO-modulators 34. An EO-modulators 30A, 30B, 30C, 30D, and 30E are all substantially similar to the phase EO-modulator 30 of that shown in FIG. 3A. The EO-modulators are linearly arranged with a variable spacing between each modulator in the y-direction. Spacing between the output of the EO-modulators can be accomplished by jogging the as is shown for all waveguides in each EO-modulator with the exception of EO-modulator 30C. The distance between each of the EO-modulators, the termination of each EO-modulator in the z-direction, and the phase change caused by modulation of the electro-optic regions cause phase difference between each output. Output is characterized by a profile 308A, showing intensity distribution caused by constructive and destructive interference in the y-axis based on phase differences caused by the linear array of EO-modulators. A profile 308B shown as a dashed line, shows another intensity profile, characterized by a flat-top distribution, showing a generic flat-top distribution in the y-direction, achievable by phase modulation of the EO-modulators.

Figure 3F:
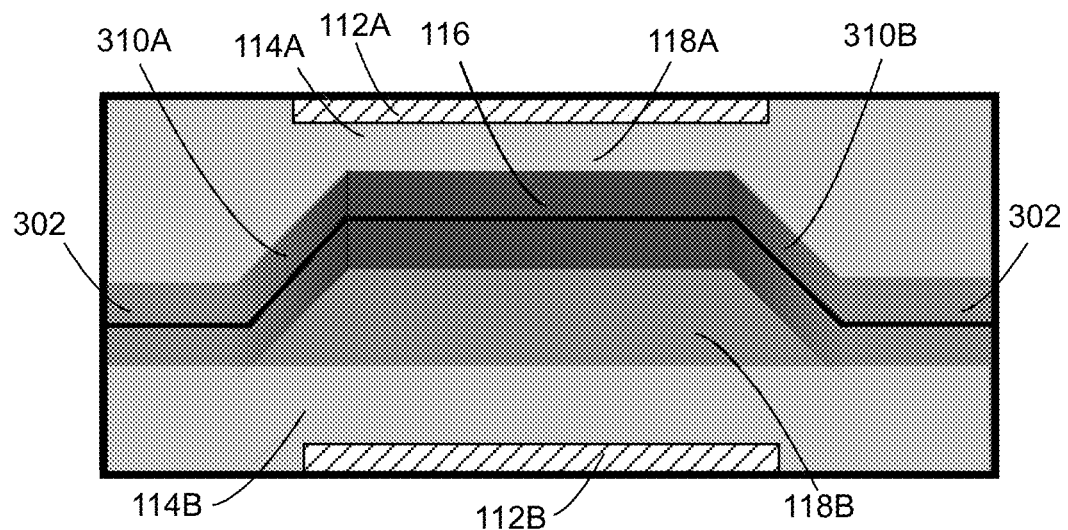
FIG. 3F is a cross-section view, schematically illustrating an optically transparent channel including a jogged waveguide coupler.

FIG. 3F schematically illustrates a jogged waveguide-coupler 35. Jogged waveguide coupler 35 is shown in cross-section view, along the waveguide. Waveguide coupler 35 is characterized by waveguide 302 transitioning into a refractive-gradient 310A, which refracts light into the electro-optic region, thereby jogging the light out of the waveguide and into the electro-optic region. The electro-optic region is surrounded by the dielectric cladding layers 118A and 118B, dielectric cladding layer 118B being the waveguide 302. The dielectric cladding layers are surrounded by dielectric buffer-layer 114A and 114B, which are in contact with electrodes 112A and 112B, respectively. The light travels through the electro-optic region and returns to the waveguide via a refractive gradient 310B. A jogged waveguide coupler, in which the light passes through multiple planes, allows for the electro-optic region to be formed independently from the waveguide, allowing for design with different geometries and thereby different modal designs for the electro-optic region.

Figure 3G:
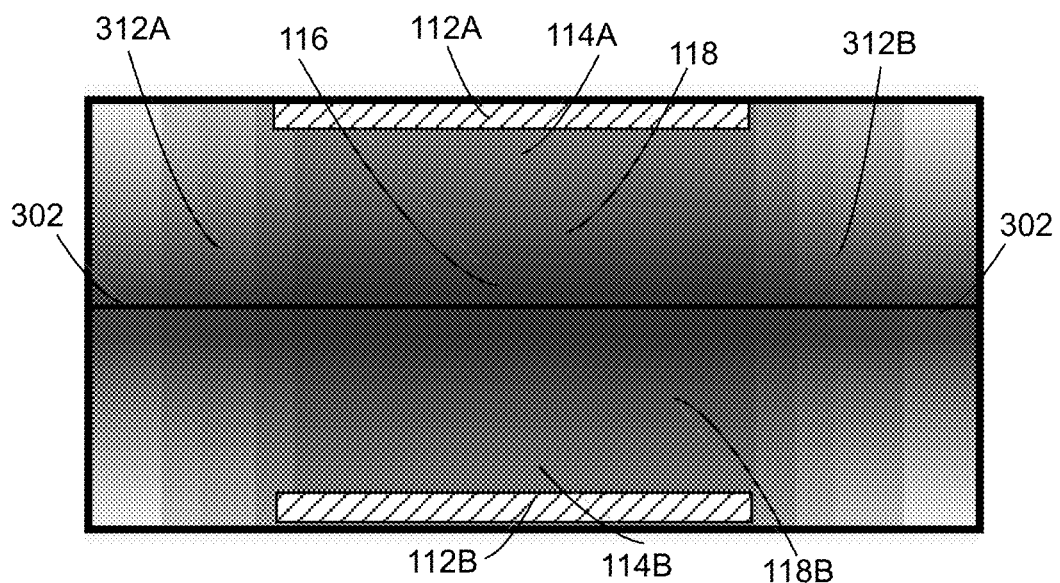
FIG. 3G is a cross-section view, schematically illustrating a waveguide coupler that is straight with respect to all axes.

FIG. 3G schematically illustrates a straight waveguide coupler 36. Straight waveguide coupler 36 is similar to waveguide coupler 35, except that straight waveguide coupler 36 couples light from waveguide 302 straight into the electro optic-region via a straight refractive-gradient 312A and exits the electro-optic region via a straight refractive-gradient 312B. Both of the jogged waveguide and straight waveguide couplers can be used to couple light into the electro-optic regions described herein.

Figure 4A:
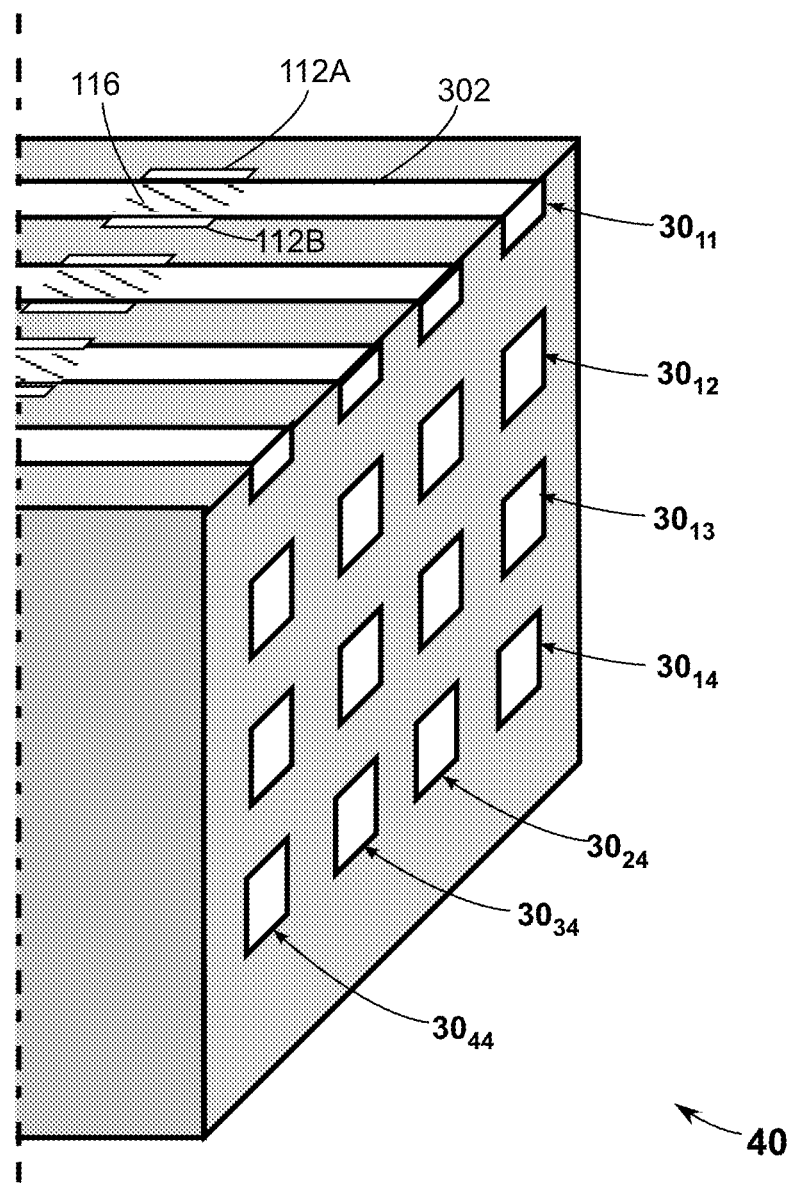
FIG. 4A is a perspective view, partly in cross-section, schematically illustrating a three-dimensional phase array of a plurality of optically transparent channels, one or more including an EO-modulators.

FIG. 4A is a perspective-view partly in cross-section schematically illustrating a two-dimension phase array EO-modulator 40. EO-modulator 40 comprises of EO-modulators represented by a subscript x-y designation. For example An EO-modulators $30_{11}$, $30_{12}$, $30_{13}$, and $30_{14}$, are all located about the same y-coordinate. Likewise an EO-modulators $30_{14}$, $30_{24}$, $30_{34}$, and $30_{44}$ are all located about the same x-coordinate. Not all EO-modulators are labeled for illustrative purposes, but using the following guidance any one particular EO-modulator can be identified. Reference to the EO-Modulators with a designation $30_{xy}$ will be referenced in the plural with numeral designation $30xy$. EO-modulators $30_{xy}$ are all substantially similar to EO-modulator 30 as shown in FIG. 3A and as exemplified by EO-modulator $30_{11}$. EO-modulators $30_{xy}$ can be arranged in a grid, radially, and with various spacing, similar to that shown in the linear array in FIG. 3E. The position and spacing between each of the EO-modulators define a phase-array which can generate radiation patterns and alter those radiation patterns, via constructive and destructive interference, by modulating the phase via modulation of the individual EO-modulators.

Figure 4B:
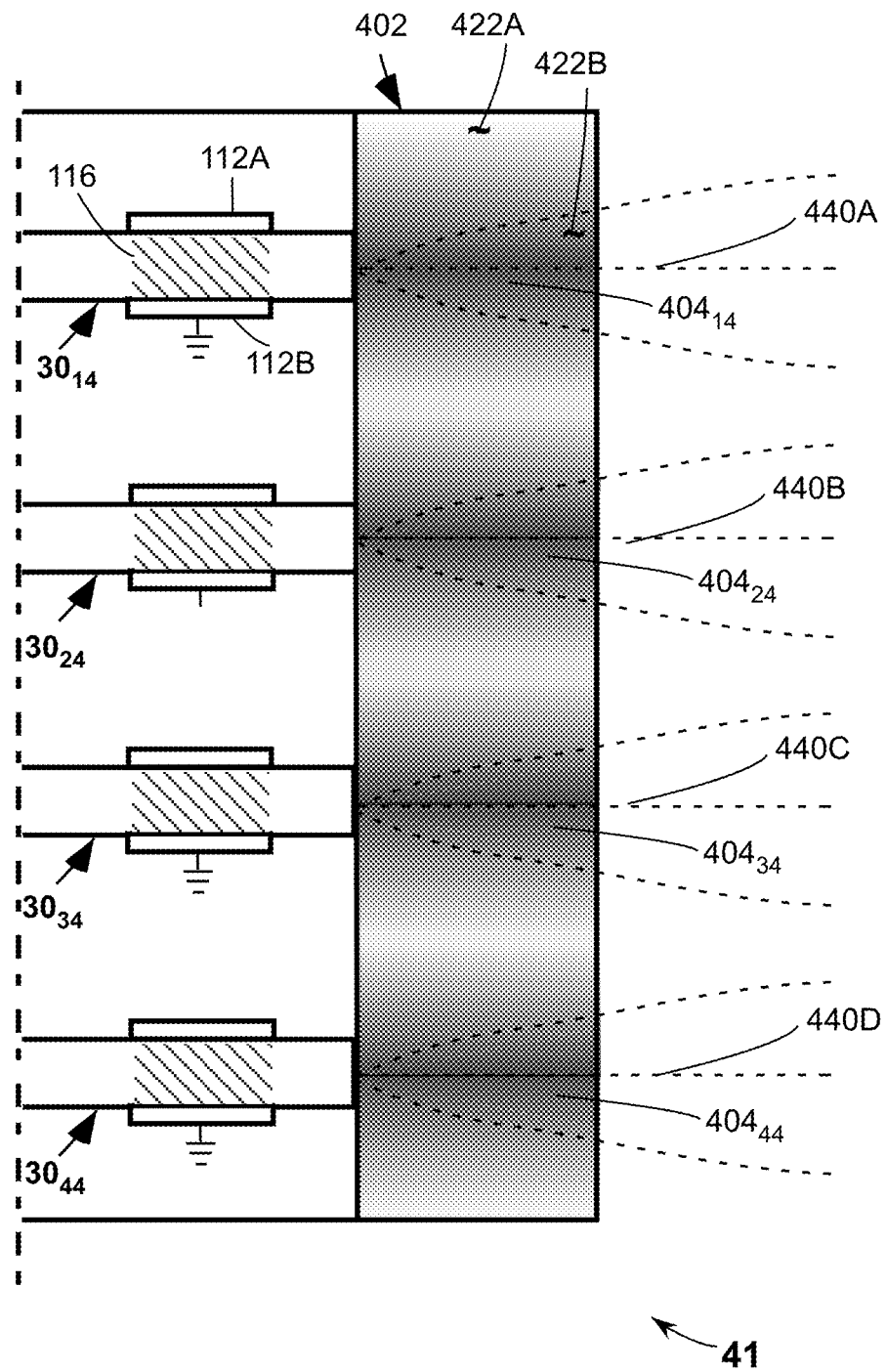
FIG. 4B is a cross section view schematically illustrating that shown in FIG. 4A, further comprising a variable refractive index region in each of the optically transparent channels, forming a lens-array, the lens array aligned such that each lensing element couples light into the optically transparent channels, one or more of the optically transparent channels including an EO-modulator.

FIG. 4B is a cross-section view schematically illustrating that shown in in FIG. 4A, with the addition of an ink-jet printed lenses array. An optical modulator 41 comprises of EO-modulators as that shown in EO-modulator 40 in FIG. 4A. EO-modulator 41 further comprises a lens array 402. Lens array 402 is an ink-jet printed gradient refractive-index (GRIN) lens array, printed as part of the EO-modulator. Lens array 402 comprises of individual GRIN lenses for an individual EO-modulators, $404_{14}$, $404_{24}$, $404_{34}$, and $404_{44}$ shown. Each GRIN lens is characterized by a grayscale, the darker areas representing higher refractive-index and thus higher concentration of nanoparticles. EO-modulator is functionally similar to EO-modulator 40 of FIG. 4A, except that the light radiation, exemplified by a beam 440A, 440B, 440C, and 440D is directionalized by the GRIN lens of each respective beam.

Figure 5A:
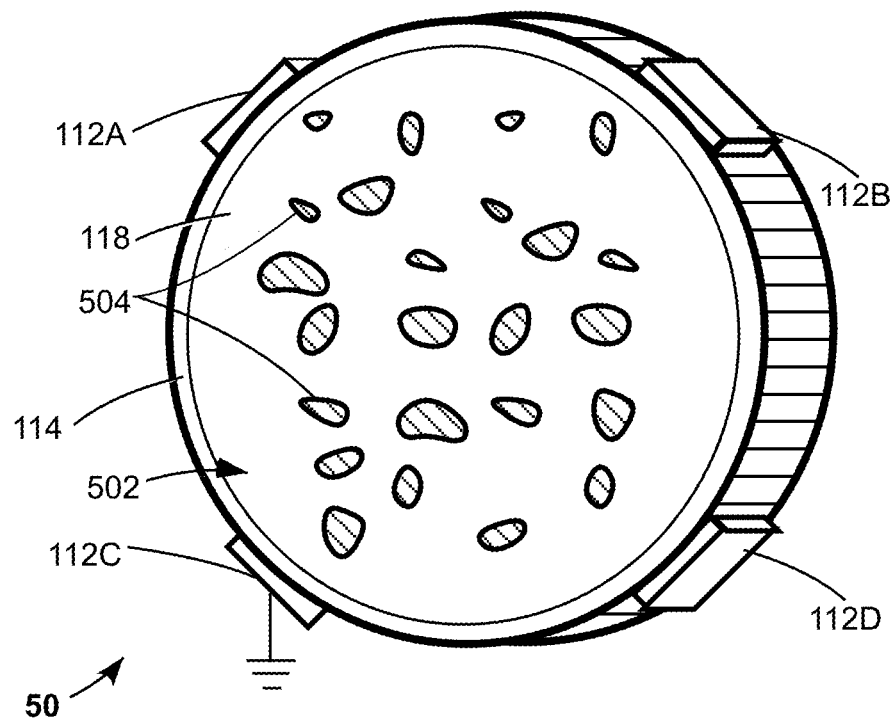
FIG. 5A is a perspective view schematically illustrating a random phase EO-modulator.
Figure 5B:
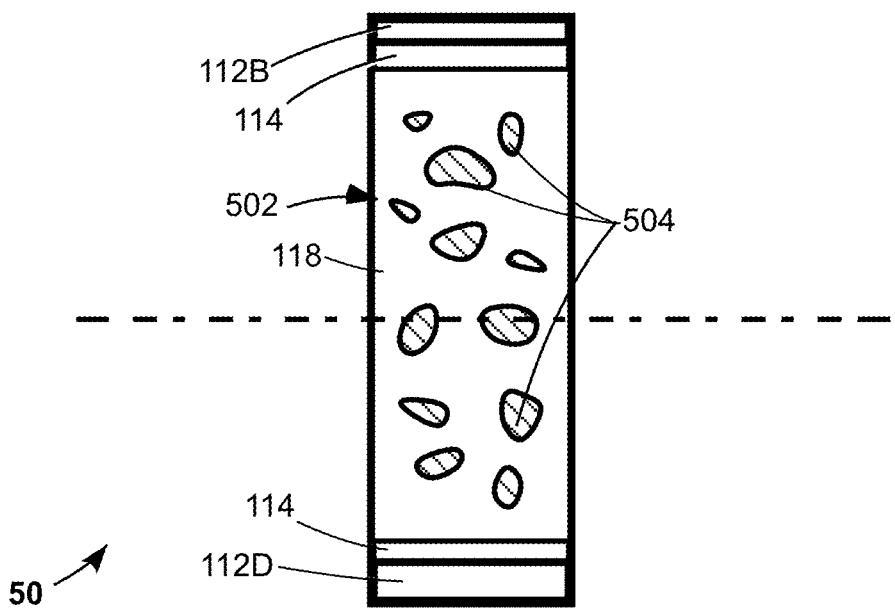
FIG. 5B is a cross-section view schematically illustrating the random phase EO-modulator of that shown in FIG. 5A.

FIGS. 5A and 5B schematically illustrate a random phase electro-optic modulator 50 in accordance with the present disclosure. FIG. 5A being a perspective view, FIG. 5B being a cross-section view. Random phase electro-optic modulator 50 has an electro-optic region 502, wherein the electro optic region is circular with an open aperture permitting a beam of light to enter and exit. Electro-optic region 502 has multiple randomly distributed pockets of an electro-optic material 504 within dielectric layers 118 such that light entering the Random phase EO-modulator will transmit through at least a portion of electro-optic material 504. Electro-optic region 502 is surrounded by a dielectric buffer-layer 114 around the entire perimeter of electro-optic region 502. Electrodes 112A, 112B, 112C, and 112D are evenly spaced around the electro-optic region circumference, with the buffer-layer between. Electric signals on electrodes 112A, 112B, or 112D, or combinations thereof cause modulation of random positioned electro-optic material 504. Electrodes 112C is marked ground by way of example. High frequency modulation, mixed random signals generation, or combination thereof on electrodes 112A, 112B or 112D allow for random phase modulation of light entering and exiting the random phase modulator. Large potentials are required for the larger random phase electro-optic modulator as compared to other EO-modulator described.

Figure 6A:
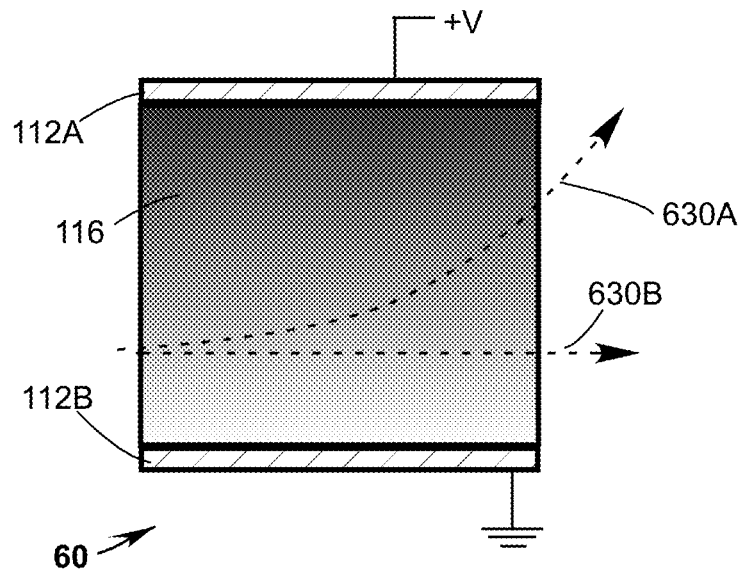
FIG. 6A is a plan-view schematically illustrating a beam-steering EO-modulator with potential across the electrodes.
Figure 6B:
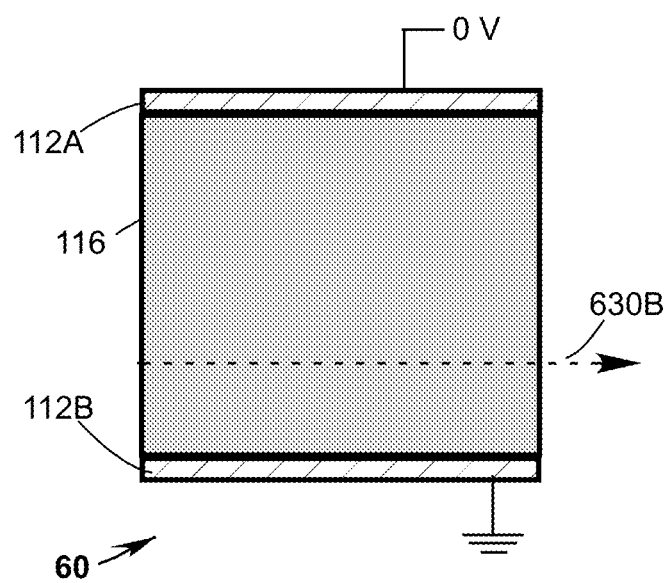
FIG. 6B is a plan-view schematically illustrating the beam-steering EO-modulator of that shown in FIG. 6A with no potential across the electrodes.

FIGS. 6A and 6B schematically illustrate a beam-steering EO-modulator 30 in accordance with the present disclosure. Referring to FIG. 6A, electro-optic region 116 has a gradient refractive profile with the electric field applied across electrodes 112A and 112B. The refractive gradient profile is due to varying eo-polymer concentration in the electro-optic region. A light beam 630A is refracted through the electro-optic region exiting at an angle. Referring to FIG. 6B, no electric field is applied resulting in no refractive gradient in the electro optic region. A light beam 630B travels through the electro optic region, exiting at the same angle that the light entered.

From the description of the present disclosure provided herein one skilled in the art can design the EO-modulator and implement them in the described applications in accordance with the present invention. Those skilled in the art to which the present invention pertains will recognize that while above-described embodiments of the inventive optical-element and method of manufacture are exemplified using particular configurations and deposition techniques, others may be used without departing from the spirit and scope of the present invention.

In summary, the invention is described above in terms of particular embodiments. The invention, however, is not limited to the embodiments described and depicted herein. Rather, the invention is limited only by the claims appended hereto.

What is claimed is:

1. A nanocomposite optical modulation device comprising:

An optically transparent channel that transmits light with an electro-optic region comprising materials exhibiting nonlinear electro-optic properties;

a dielectric layer, at least one of the dielectric layers in contact with the electro-optic region;

an electrode, the electrode in proximity to the electro-optic region;

wherein at least one of the aforementioned elements comprises a cured nanocomposite-ink with nanoparticle loading from about 0.25% to about 70% volume; and wherein at least one of the aforementioned elements has a non-uniform distribution of nanoparticle fillers, in multiple planes of the device that influences the transmission of light through the optically transparent channel.

2. The device of claim 1, wherein one or more of the electrodes are in contact with one or more of the dielectric layers and in proximity to the optically transparent channel, wherein the dielectric layer is a buffer-layer with nanoparticles to increase the dielectric layer's dielectric strength.

3. The device of claim 2, the dielectric layers having nanoparticle loading to increase the dielectric layer's resistance.

4. The device of claim 1, wherein the electro-optic region is randomly distributed as pockets of electro-optic material within transparent organic material not exhibiting electro-optic properties.

5. The device of claim 1, wherein modulation of the electro-optic region modulates a light-beam's exiting angle.

6. The device of claim 1, further comprising a substrate, wherein the substrate is wafer, PCB board or other device with electronics.

7. The device of claim 1, further comprising a heating element, the heating element in proximity to the electro-optic region of the optically transparent channel, wherein heat form the heating element changes the electro-optic region's refractive index.

8. The device of claim 1, wherein the dielectric layer is a cladding-layer, the cladding-layer making the optically transparent channel a single-mode waveguide.

9. The device of claim 8 further comprising a plurality of waveguides, the plurality of waveguides splitting light-radiation into a first arm and at least a second arm, wherein at least one of the arms includes the electro-optic region.

10. The device of claim 8, further comprising an optical coupling region with nonuniform nanoparticle loading that varies radially along the optical-axis, that couples that directs light into, or out of, the transparent optical channel.

11. The device of claim 10, wherein the waveguide coupler has a non-uniform refractive-gradient region in at least one axis, the non-uniform refractive-gradient region reducing optical loss into the electro-optic region.

12. The device of claim 10, wherein the electro-optic region's size, shape, and refractive index minimizes mode mismatch losses.

13. A nanocomposite optical modulator device comprising:
  a plurality of optically transparent channel regions that transmits light with an electro-optic region comprising materials exhibiting nonlinearity electro-optic properties;
  a plurality of, one or more, cladding layers, with at least one of the dielectric layers, of each respective plurality, in contact with the electro-optic region, of that respective plurality;
  a plurality of one or more electrodes, the electrodes, of each respective plurality, in proximity to the electro-optic region, of that respective plurality;
  wherein at least one of the aforementioned elements comprise a cured nanocomposite-ink with nanoparticle loading from about 0.25% to about 70% volume;
  wherein at least one of the aforementioned elements has a non-uniform distribution of nanoparticle fillers, in at least one plane of the device that influences the transmission of light; and
  wherein a plurality of EO-modulators are formed.

14. The device of claim 13, further comprising a waveguide coupling region, wherein the waveguide coupling region has a width, shape, and nanocomposite composition to direct light from an optical waveguide into the electro-optic region.

15. The device of claim 13, wherein, permittivity or susceptibility is increased in one or more layers of the plurality of the dielectric layers by nanoparticle filler loading in the dielectric layer's organic-host material.

16. The device of claim 13, further comprising a substrate, wherein the substrate is wafer, PCB board or other device with electronics.

17. The device of claim 13 wherein, for at least one channel containing the electro-optic region, one or more of the dielectric layers in contact with the electro-optic region are cladding-layers with radial patterns that are non-uniform in at least one plane passing perpendicular to or through the optical axis.

18. The device of claim 17 further comprising a waveguide-splitter, the waveguide-splitter splitting light-radiation into a first arm and a second arm, the arms recombining into a single waveguide, the first arm and the second arm each having at least one of the electro-optic regions.

19. The device of claim 17, wherein the plurality of electro-optic regions are oriented in a two dimensional plane.

20. The device of claim 17, wherein the plurality of waveguides form a three-dimensional array electro-optic phase array.

21. The device of claim 20, further comprising a plurality of gradient refractive index optical coupling regions, wherein the plurality of gradient refractive index optical coupling regions couples light into or out of one of the plurality of optically transparent channels.

22. The device of claim 17, further comprising a waveguide coupling region for one or more of the plurality of the EO-modulators, wherein the waveguide coupler has a non-uniform nanoparticle filler concentration that directs light into, or out of, the electro-optic region in one or more of the plurality of EO-modulators.

23. The device of claim 22, wherein the waveguide coupler directs light into, or out of, the plurality of electro-optics regions in another plane of the device not along the optical-axis by non-uniform nanoparticle loading along multiple planes.

24. The device of claim 22, wherein the electro-optic region's size and refractive index is designed to reduce waveguide mode mismatch losses between the waveguide and the electro-optic region.

25. The device of claim 17, further comprising a heating element for each of the plurality of EO-modulators, wherein heat from the heating element changes the electro-optic region's refractive index in the respective EO-modulator.

* * * * *